Sept. 28, 1943.  J. L. HIPPLE  2,330,283
TRACTOR MOUNTED IMPLEMENT
Filed March 20, 1941  2 Sheets—Sheet 1

Inventor
James L. Hipple
By Paul O. Pippel
Atty.

Sept. 28, 1943.  J. L. HIPPLE  2,330,283
TRACTOR MOUNTED IMPLEMENT
Filed March 20, 1941   2 Sheets-Sheet 2
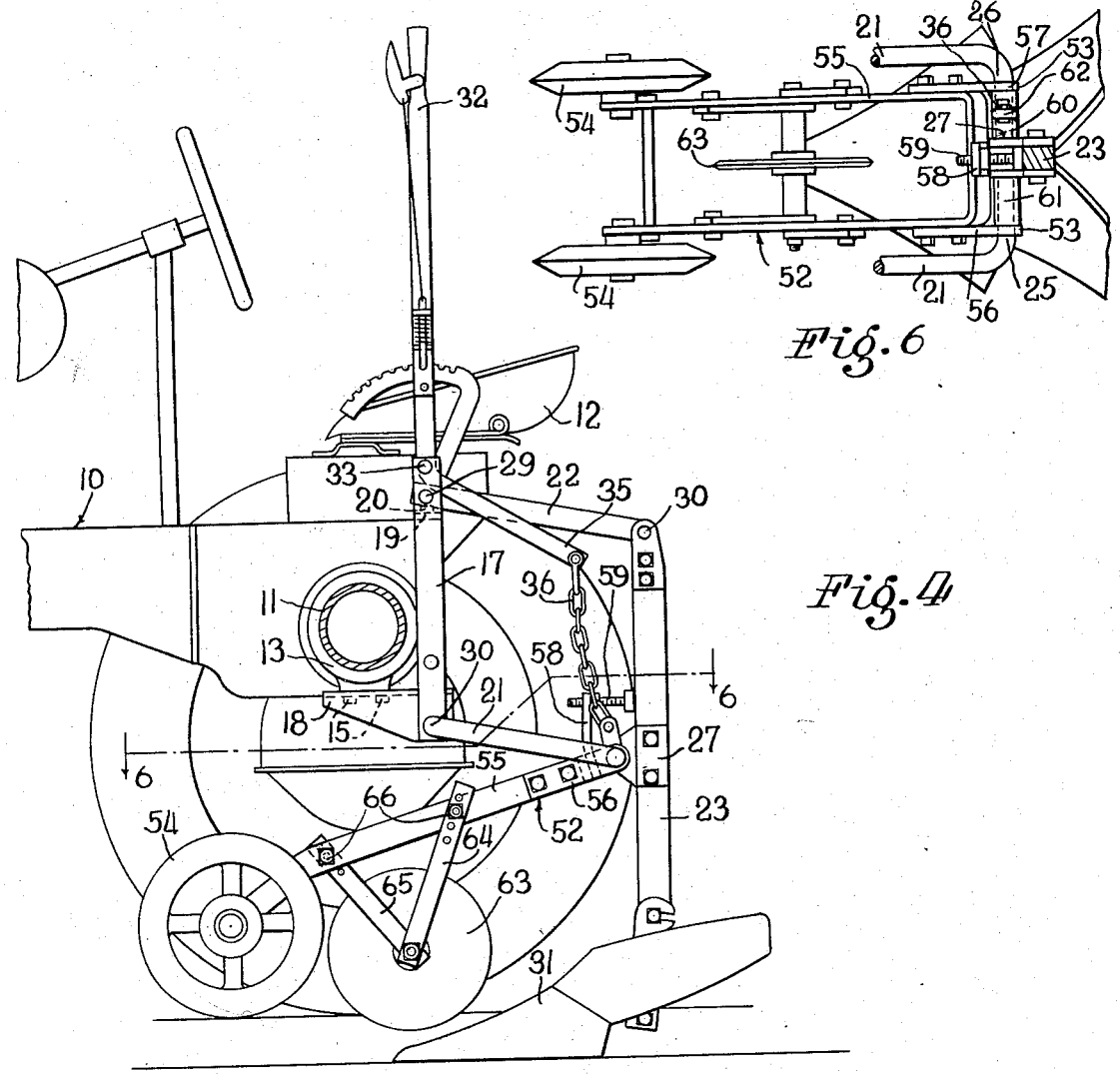
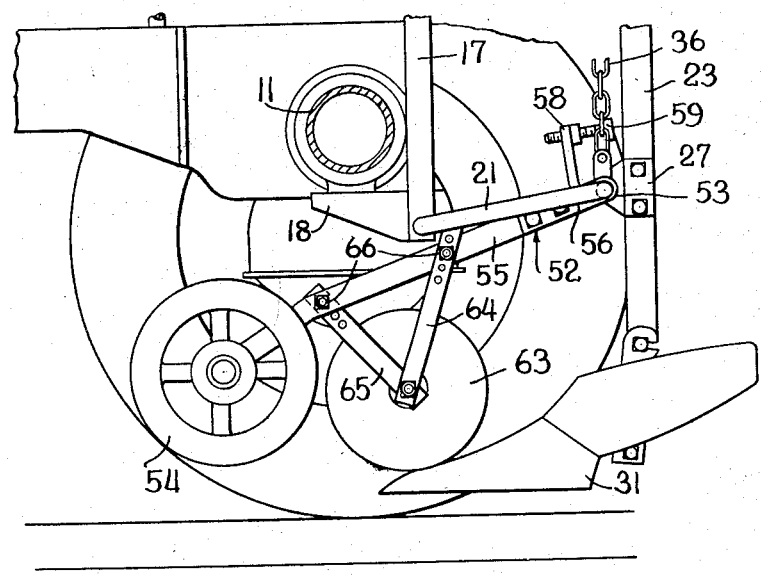
Inventor
James L. Hipple
By Paul O. Pippel
Atty.

Patented Sept. 28, 1943

2,330,283

UNITED STATES PATENT OFFICE 2,330,283

TRACTOR-MOUNTED IMPLEMENT

James L. Hipple, Canton, Ill., assignor to International Harvester Company, a corporation of New Jersey Application March 20, 1941, Serial No. 384,279

8 Claims. (Cl. 97—47)

This invention relates to tractor-mounted implements and more particularly to means for the connection thereto of depth gauge and coulter wheels.

It is an object of the present invention to provide a gauge means for a tractor-mounted implement which is so constructed and arranged in its connection with the tool beam of the implement that it may extend under a portion of the tractor and yet allow the implement beam to be raised without the gauge means interfering with the body portion of the tractor.

It is another object of the invention to provide a combination gauge wheel and coulter wheel unit for tractor-mounted implements, and likewise such a unit which can extend under the tractor and yet not cause interruption of the vertical movement of the implement beam when the unit and beam are raised to transport position.

It is another object of the invention to provide in a combination gauge wheel and coulter wheel unit adapted for use with tractor-mounted implements, means wherein either the gauge wheel or the coulter wheel may be adjusted respectively with respect to each other.

It is another object of the invention to provide a combination gauge wheel and coulter wheel arrangement wherein more effective gauging of the working tool and improved operation of the coulter wheel will be simultaneously obtained.

According to the present invention, there is provided a tractor-mounted implement having a vertically extending tool beam which is connected to the tractor for vertical movement to and from its ground-working position. Connected to the working tool beam is a combination gauge wheel and coulter wheel unit. This unit is connected to the tool beam by lost motion connection means so that when the working tool is raised, a certain amount of independent movement of the working tool may be had prior to effecting lifting movement of the combination gauge wheel and coulter unit. Means is provided for both independent vertical adjustment of the gauge wheel and of the coulter wheel with respect to the working tool, the adjustable means usually taking the form of adjustable stops, adapted to abuttingly engage with the tool beam upon the working tool and the gauge and coulter wheels being lowered to their working positions.

For other objects and for a better understanding of the invention, reference may be had to the following detailed description taken in conjunction with the accompanying drawings, in which:

Figure 4 is a view in elevation showing a rear portion of a tractor and of the tractor-mounted implement and similar to the showing of Figure 1 but the implement embodying another form of combination gauge wheel and wheel unit;

Figure 5 is a veiw similar to Figure 4 incorporating the last-mentioned form of the unit and illustrating how the unit is raised by contact of the working tool with the coulter wheel upon the working tool being raised out of its ground-working position to its transport position; and, Figure 6 is a plan view of the combination gauge wheel and coulter wheel unit shown in the Figures 4 and 5 and taken along the line 6—6 of Figure 4.

Figure 1:
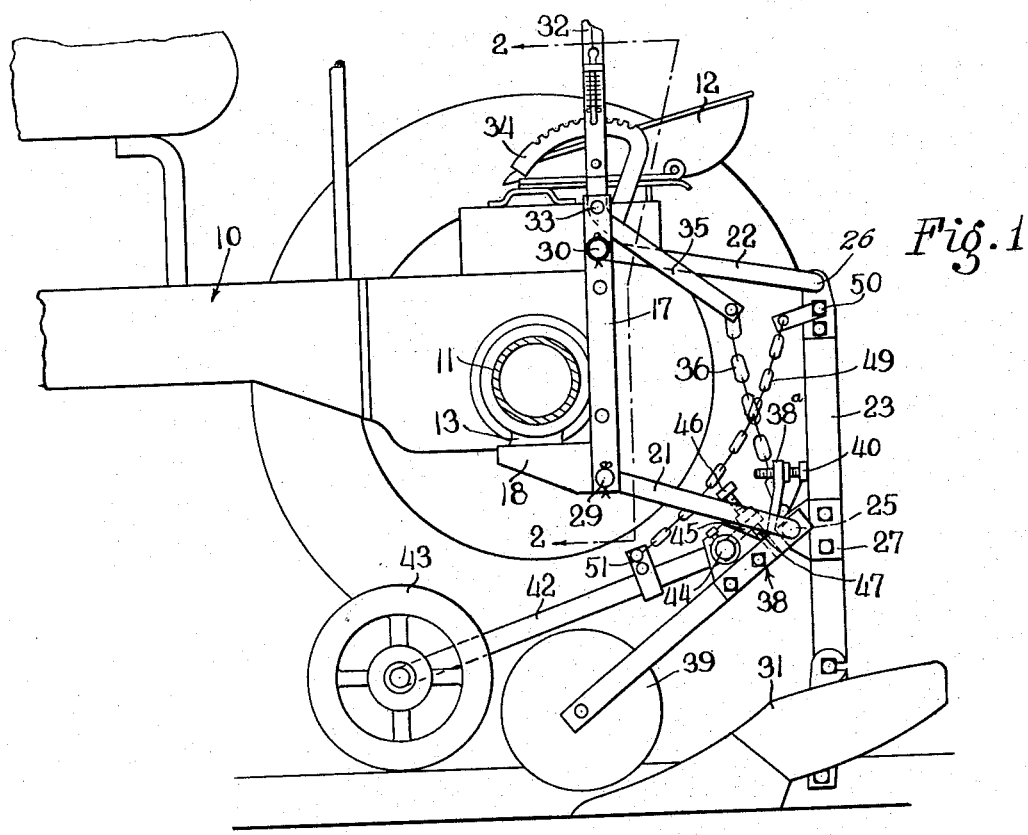
Figure 1 is a view in side elevation of the rear portion of a tractor to which the tractor-mounted implement embodying the features of the present invention is connected.
Figure 2:
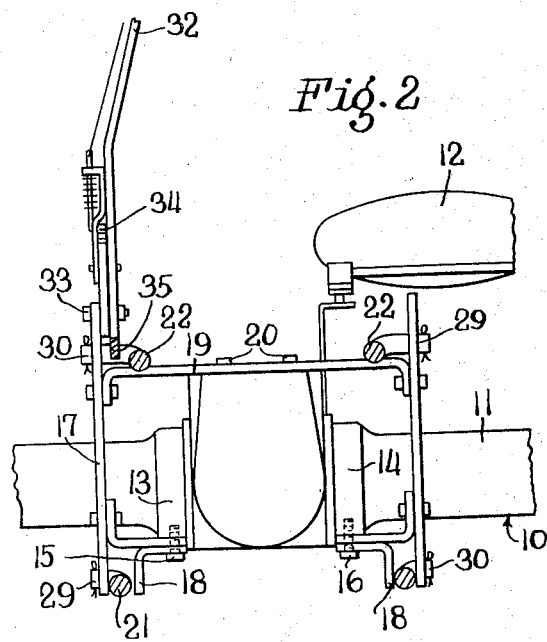
Figure 2 is a rear view in elevation of a portion of the tractor and of the tractor-mounted implement taken along the lines 2—2 of Figure 1.
Figure 3:
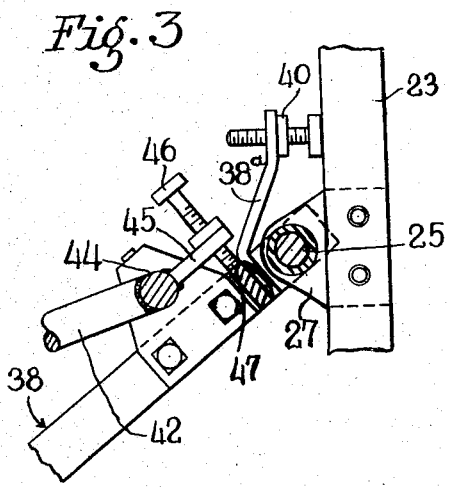
Figure 3 is an enlarged detail view showing a portion of the combination gauge wheel and coulter wheel unit and illustrating its connection with the vertical tool beam.

Referring now particularly to Figures 1, 2, and 3, there is shown a tractor or tool-supporting means 10 having a transverse rear axle portion or structure 11 on which is mounted an operator's station 12. On the axle portion 11 is provided attaching portions 13 and 14 adapted for receiving fastening screw bolts 15 nad 16, respectively. To the tractor is connected a tractor-mounted implement having a vertically extending attaching bracket portion 17 including forwardly and longitudinally extending portions 18 adapted for the connection of the implement to the attaching portions 13 and 14 of the tractor to be fastened thereto by means of the fastening bolts 15 and 16. This frame structure also includes a transverse portion 19 extending laterally across the rear of the tractor and adapted for attachment to the upper portion of the axle structure by means of bolts 20. Upon fixing the bolts 20, the vertically extending frame 17 will be rigidly connected to the tractor. Connected in vertically spaced relation to the vertically extending frame 17 are lower and upper lifting and draft bails 21 and 22 to the free ends of which is connected a vertically extending tool beam 23. These bails have transverse portions 25 and 26 which respectively extend through transverse openings in brackets 27 rigidly secured one above the other to the vertical tool beam 23. The bails 21 and 22 are respectively connected, as indicated at 29 and 30, to the vertically extending frame structure 17 for pivotal movement.

It should now be apparent that the tool beam 23 may have vertical movement so that a working tool 31 may be pulled out of its ground-working position to a position of transport on the tractor. On the upper part of the vertically extending frame structure 17 is mounted for pivotal movement a lifting lever 32, as indicated at 33, for operation about a quadrant 34 also mounted on the vertical frame 17. The lever 32 is accessible to the operator's station 12 and upon rocking the same forwardly, the lever portion of the lever, formed into a lifting arm 35, is rotated in a counter-clockwise direction. On the free end of the lifting arm 35 is connected a chain 36 which is in turn connected to the bracket structure 27. Thus, as the lifting lever 32 is moved forwardly, the tool beam 23 and the working tool 31 will be lifted, by means of the lifting arm 35 and the chain 36, to a transport position.

According to the form of the invention shown in Figures 1 and 3, there is pivotally connected to the transverse portion 25 of the bail 21 a connecting means 38 which has a coulter wheel 39 on a forwardly extending portion thereof. This connecting means 38 is pivoted about the transverse portion 25 and has an upwardly extending portion 38a carrying an adjustable stop 40 adapted for engagement with the forward face of the tool beam 23. The coulter wheel 39 is arranged to extend to a location immediately above the working tool 31.

To the connecting means 38 is pivotally connected a forwardly extending structure 42, to which there is connected a gauge wheel 43 arranged to be in advance of the coulter wheel 39 and of the working tool 31. The rearward end of this structure 42 is pivotally connected to the connecting means 38, as indicated at 44. Extending rearwardly from its pivotal connection 44 is a portion 45 of the structure 42 to which is connected an adjustable stop means 46 adapted to engage the structure 38, as indicated at 47. It should thus be apparent that the gauge wheel means 42—43 is adjustable with respect to the coulter wheel connecting means 38, and since the connection point 44 is so near to the point of connection of the structure 38 with the beam 23, any adjustment of the stop means 46 will also be with respect to the tool beam. While the gauge means, provided by the structure 42 with the gauge wheel 43, is limited in its upward movement it will be apparent that in its downward movement it is more or less unlimited, the limitation being only by its contact with the ground. In other words, the gauge means will have a substantial amount of movement in one direction independently of the working tool beam 23, which movement will allow the working tool to be moved vertically to some distance independently of the gauge means. This lost motion is desirable because the gauge means extends forwardly from the vertically extending beam to a location well underneath the transverse axle portion of the tractor. It should thus be apparent that there has thereby been provided a gauge means which may be located beneath the tractor since by its pivotal connection with the tool beam it will permit adequate vertical movement of the working tool, when the same is raised to transport position. Thus, by this arrangement there is made possible a tractor implement of a type which can be closely connected to a tractor having a low clearance with respect to the ground. As the working tool beam 23 is raised, the same will be moved a considerable distance before the gauge means is raised with it. The amount of movement is dependent upon the length of a chain 49 connected to one of the bracket structures 27 on the upper end of the tool beam 23, as indicated at 50, and to a connecting means 51 on the gauge wheel supporting structure 42. Once the slack of the chain 49 is taken up the gauge wheel will be raised out of its operating position. The working tool 31 will have preceded the gauge means 43 in its lifting movement and will have advanced upwardly ahead of the gauge means until such time as the gauge means is lifted with it. The coulter wheel 39 will be engaged by the working tool 31 and is thus lifted by the working tool, also at a time after some movement of the working tool has preceded that of the coulter wheel 39. The upward movement of the coulter wheel and the gauge wheel relative to the working tool 31 is dependent upon the setting respectively of the adjustable stops 40 and 46.

Referring now particularly to Figures 4, 5, and 6, there is shown a similar tool beam and connecting structure for the connecting of the same with the tractor, but showing another form of the combination gauge wheel and coulter wheel unit. This form differs from the form shown in Figures 1 and 3 in that the gauge wheel supporting structure serves as a support for the coulter wheel, whereas in the form shown in Figures 1 and 2, the coulter wheel supporting structure serves as a support for the gauge wheel supporting structure. In this form there is provided a gauge wheel supporting structure 52 pivoted to the brackets 27, as indicated at 53. This supporting structure 52 extends forwardly underneath the transverse axle portion 11 of the tractor for the connection thereto of gauge wheels 54.

Referring particularly to Figure 6, it will be noted that the supporting structure 52 takes the form of a U-shaped member 55, the legs of which serve as a means for the connection of the individual gauge wheels 54, arranged in laterally spaced relationship so that the gauge means is particularly adaptable for riding along a ridge. To the open end of the U-shaped member 55 are connected the laterally spaced straps 56 and 57 having openings therein for providing the pivotal connection 53 of the U-shaped member 55 on the transverse portion 25 of the lower bail member 21. Extending upwardly from the apex end of the U-shaped member 55 is an arm 58 which carries an adjustable stop 59 adapted for engagement with the vertical beam 23. This adjustable stop 59 limits the movement of the unit about its pivot 53. On the transverse portion 25 of the lower bail 21 are sleeve members 60 and 61 extending between the plate members 56 and 57. These sleeve members 60 and 61 serve to maintain the beam structure 23 in its proper lateral position on the transverse portion 25 of the lower bail member 21. The sleeve member 60 has a lug 62 to which is connected the chain 36 for the purpose of effecting lifting movement of the tool beam 23 and its tool 31.

As the tool beam 23 is lifted to its transport position the gauge means comprising the supporting structure 52 and gauge wheels 54 will remain in contact with the ground through a substantial amount of the lifting movement of the tool beam 23. This amount of movement is dependent upon the connection of a coulter wheel 63 to the gauge wheel supporting structure 52. This coulter wheel 63 is disposed centrally with respect to the respective gauge wheels 54 and is there retained by means of vertically extending straps 64 and 65 having in their upper ends a series of holes which thereby serve, when taken in connection with the attaching bolts 66, as means for varying the position of the coulter wheel with respect to the gauge wheels 54. The coulter wheel 63, however, is so positioned as to be contacted by the working tool 31, and as the vertical movement of the working tool 31 continues, the coulter wheel and gauge wheel means will be caused to move vertically with the working tool 31. This vertical movement will continue until the working tool 31 reaches a position well out of the ground, as shown in Figure 5, and wherein the gauge means would be lifted to a location just free of interference with the transverse portion of the tractor.

It should now be apparent that there has been provided a combination gauge and coulter unit adapted to extend under the body portion of a tractor and forwardly of the working tool whereby adequate lifting movement of the working tool may be had without the unit, forming a part of the implement, interfering with the transverse portion of the tractor. It should further be apparent that there has been provided a combination gauge and coulter wheel means which is attachable to the tool beam as a unit, and that this unit is of simple construction providing for a pair of spaced gauge wheels centrally of which is disposed a coulter wheel which, as in at least one form of the invention, may serve as a means through which lifting movement is imparted by the working tool.

While various changes may be made in the detail construction, it shall be understood that these changes shall be within the spirit and scope of the present invention as defined by the appended claims.

What is claimed is:

1. In combination, a tractor having a rear axle portion, a tool beam connected to the tractor for vertical movement and located rearwardly of the axle portion, a ground-working tool carried by the tool beam in rear of the axle portion, depth gauge means adapted to be connected to the tool beam and arranged to extend forwardly and beneath the rear axle portion of the tractor, means for vertically moving the tool beam, and lost motion means for connecting the gauge means to the tool beam to permit a substantial amount of vertical movement of the tool beam before effecting movement of the gauge means when the tool beam and the gauge means are lifted.

2. In combination, tool-supporting means, ground-working tool means connected to the tool-supporting means for vertical movement to and from its ground-working position, means for vertically moving the tool-supporting means, a combination gauge and coulter wheel unit structure connected to the ground-working tool means for free movement in a downward direction but limited in its movement in an upward direction with respect thereto, said structure including a coulter wheel adapted to be engaged by the working tool means to thereby effect lifting of the combination structure when the working tool means is lifted.

3. In combination, tool-supporting means, ground-working tool means connected to the tool-supporting means for vertical movement to and from its ground-working position, means for vertically moving the tool-supporting means, a combination gauge and coulter wheel structure pivotally connected in its entirely to a single location to the ground-working tool means for vertical adjustment, said structure including gauging and coulter wheel elements, and means for adjusting one of the elements with respect to the other of the elements and means for adjusting the entire structure with respect to the working tool means.

4. In combination, tool-supporting means, ground-working tool means connected to the tool-supporting means for vertical movement to and from its ground-working position, means for vertically moving the tool-supporting means, a combination gauge and coulter wheel structure connected to the ground-working tool means for free movement in a downward direction but limited in its movement in an upward direction with respect thereto, said structure including gauging and coulter wheel elements, the said coulter wheel adapted to be engaged by the working tool means to effect lifting of the combination structure when the working tool means is lifted, and means for adjusting one of the elements with respect to the other of the elements and with respect to the working tool means.

5. In combination, tool-supporting means, working tool means connected to the tool-supporting means for free vertical movement in its working position, gauge means connected to the working tool means for movement with respect thereto, means for limiting the movement of the gauge means in an upward direction with respect to the working tool means, said gauge means extending forwardly ahead of the working tool means and including laterally spaced gauge wheels adapted to ride along respectively the sides of a previously formed ridge.

6. In combination, tool-supporting means, ground-working tool means connected to the tool-supporting means for vertical movement to and from its ground working position and including a working tool element having a face portion, means for vertically moving the ground-working tool means, a combination gauge and coulter wheel structure connected to the working tool means for substantially free downward movement with respect thereto but limited in its upward movement with respect thereto, said structure including a coulter wheel element arranged to be engaged by the face portion of the working tool element when the working tool means is lifted whereby lifting of said combination structure is accordingly effected.

7. In combination, tool-supporting means, ground-working tool means connected to the tool-supporting means for free vertical movement in its ground-working position, a combination gauge and coulter wheel structure connected to the working tool means for vertical movement with respect thereto, means for limiting the upward movement of the said structure with respect to the ground-working tool means, said structure including laterally spaced gauge wheels and a coulter wheel, and said coulter wheel being centrally disposed with respect to the laterally spaced gauge wheels.

8. In combination, tool-supporting means, ground-working tool means connected to the tool-supporting means for free vertical movement in its ground-working position, said ground-working tool means including a ground-working tool having a top face portion, means for lifting the ground-working tool means, a combination gauge and coulter wheel structure connected to the working tool means for vertical movement with respect thereto, means for limiting the upward movement of said structure with respect to the ground-working tool means, said structure extending forwardly of the ground-working tool and including laterally spaced gauge wheels contacting the ground ahead of the working tool and a coulter wheel centrally disposed with respect to the respective laterally spaced gauge wheels and in vertical alinement with the top face of the working tool to be engaged by the same when the working tool means is lifted, whereby lifting of the said combination structure is accordingly effected.

JAMES L. HIPPLE.